June 2, 1936.　　　　D. C. BUTTS　　　　2,042,585
METHOD FOR HYDROGENATION OF ESTERS OF ABIETIC ACID
Original Filed May 22, 1931
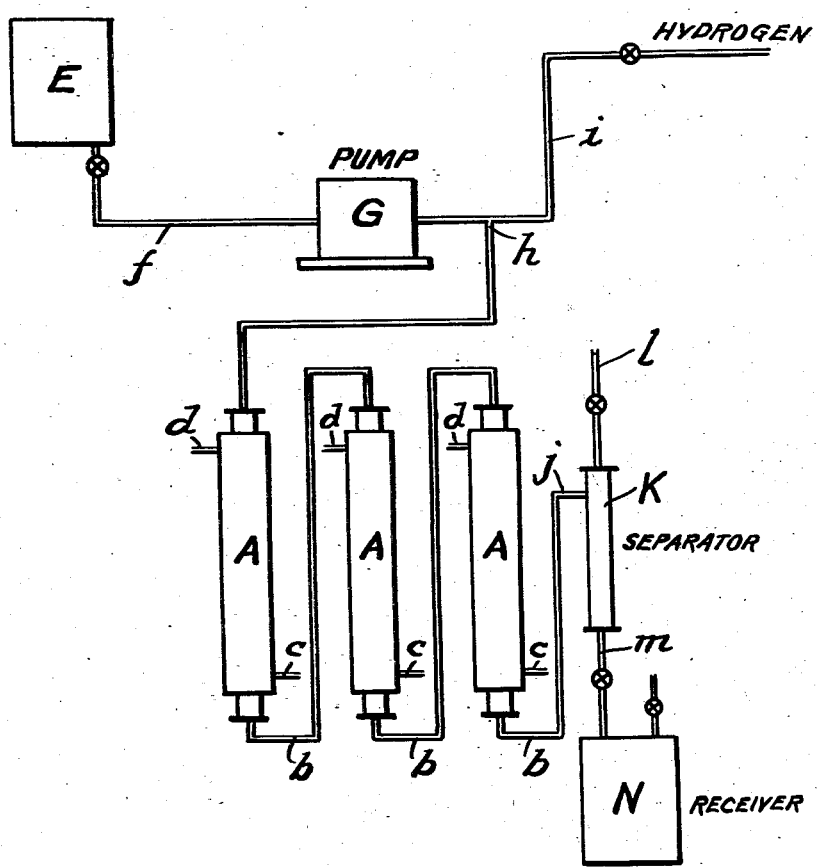

Patented June 2, 1936

2,042,585

UNITED STATES PATENT OFFICE 2,042,585

METHOD FOR HYDROGENATION OF ESTERS OF ABIETIC ACID

Durain C. Butts, Fairville, Pa., assignor to Hercules Powder Company, Wilmington, Del., a corporation of Delaware Application May 22, 1931, Serial No. 539,154
Renewed November 22, 1933

19 Claims. (Cl. 260—99.40)

My invention relates to a novel method for effecting hydrogenation of esters of abietic acid. More particularly my invention involves the provision of a method for effecting the hydrogenation of esters of abietic acid whereby hydrogenation may be effected continuously and whereby a product having a higher percentage of saturation with hydrogen than heretofore may be obtained.

Heretofore it has been known to hydrogenate esters of abietic acid by treatment of the ester with hydrogen, under suitable conditions of temperature and pressure and in the presence of a catalyst. However, previous methods for hydrogenation have always heretofore involved treatment of the ester in a batch and the catalyst has always been provided in non-stationary or powder form to enable it to be contacted by agitation of the ester during the treatment with hydrogen.

While the prior batch processes have produced a hydrogenated ester having many advantages, such have not been entirely satisfactory, since abietic acid esters do not lend themselves readily to hydrogenation and hence by such methods it is not economically practical to obtain desired high percentage saturation with hydrogen.

Now in accordance with my invention, I have found that if an ester of abietic acid be passed in contact with and relative to a stationary catalyst, and at the same time treated with hydrogen under suitable conditions of temperature and pressure, the ester will readily become hydrogenated and may be hydrogenated to a percentage of saturation very substantially higher than heretofore obtained. More particularly, in accordance with my invention I have found that if a stationary catalyst formed from a suitable catalytic metal, which has been oxidized and then reduced with hydrogen, is used the hydrogenation may be effected readily and with the production of a product having desired high percentage of saturation with hydrogen.

Having now indicated in a general way the nature and purpose of my invention, I will proceed to a detailed description thereof with reference to the accompanying drawing in which:

The figure is a diagrammatic illustration of the form of apparatus adapted for use in the carrying out of the method embodying my invention.

In the drawing A indicates a series of towers, which may comprise any number of towers depending upon size, percentage of saturation with hydrogen desired, temperature and pressure conditions, rate of passage of the ester therethrough, etc. The towers A are connected from bottom to top by means of pipes $b$ and are jacketed, the jackets being provided with connections $c$ for the entrance and $d$ for the exit of steam, whereby the interiors of the towers may be heated. Steam may be supplied to the jackets from any suitable source and it will be understood that any suitable means for heating the towers A may be substituted for steam jacketing.

E indicates a container for an ester of abietic acid to be hydrogenated, the container being connected by a pipe $f$ with a pump G connected with the first tower A of the series by a pipe $h$ and adapted to force ester from container E into the first tower. A pipe $i$ connected to pipe $h$ leads from any suitable supply of hydrogen under pressure. From the last tower $a$ of the series a pipe $j$ leads to a separator K in which hydrogenated ester and hydrogen discharged from the last tower of the series are separated. From the separator K a pipe $l$ enables the discharge of hydrogen to any desired receiver and a pipe M enables discharge of hydrogenated ester to a receiver N.

The towers A are, as has been indicated, provided with a stationary catalyst which may, for example, be in the form of turnings, wire, briquets, or other suitable form and the towers may be packed therewith, or the catalyst supported in any desired manner. The catalyst may comprise any suitable stationary hydrogenation catalyst, but will desirably be nickel, cobalt, platinum, palladium, or the like, or a suitable alloy, as nickel-copper, or the like. The catalyst desirably will be surface oxidized, as by treatment with nitric acid, sodium hypochlorite, etc. or by electrical or anodic oxidation and then reduced by hydrogen.

In proceeding in accordance with my invention hydrogen under suitable pressure will be passed into and through the towers A, while at the same time the ester to be hydrogenated is introduced into and passed through the towers under the influence of pump G. The ester to be hydrogenated may be, for example, an alkyl ester, as a glycerol or a glycol ester of abietic acid or it may be an ethyl, methyl, propyl, isopropyl, butyl, amyl, etc., etc. ester of abietic acid.

The ester passing through the series of towers simultaneously with the hydrogen will contact with the catalyst and hydrogenation will be effected. The hydrogenated product and excess hydrogen will be separated in the separator K from which the product will pass to the receiver N.

More specifically, in carrying out the method embodying my invention where the towers are packed, for example, with nickel turnings, which have been oxidized and then reduced with hydrogen, the temperature in the several towers may be within the range say 125° C.–250° C., or within the narrower range 160° C.–210° C., while the pressure maintained by the pressure of the hydrogen introduced into the towers may be within about the range say 10–2000 pounds or preferably say 100–500 pounds. The rate of flow of the ester through the towers may vary from 1–50 pounds per hour depending upon the size of the unit and the degree of hydrogenation desired.

As a more specific illustration, for example, with a series of three towers of a diameter of 2 inches and a height of 30 inches packed with nickel turnings, which have been activated by oxidation and subsequent reduction, ethyl abietate passed through the towers at a rate of one pound per hour with hydrogen under a pressure of 800 pounds and at a temperature of 150° C. will be 65–72% saturated with hydrogen. As a further illustration, using the same series of three towers, for example, methyl abietate may be hydrogenated by passing methyl abietate through the series of towers at a rate say of 1.5 pounds per hour under a pressure of about 250 pounds and a temperature of 165° C. The hydrogenated methyl abietate product will have about 55% hydrogen saturation.

As will be appreciated the catalyst may be supported in such manner, as in inner liners in the towers, so that it may readily be removed for revivification when it becomes poisoned.

In the practice of the method in accordance with my invention, I have found that desired saturation with hydrogen up to 84% or more may be obtained as compared with saturation up to 70%, the practical maximum by prior methods with a nickel catalyst and at the same time the desired saturation may be obtained more readily and economically than heretofore.

What I claim and desire to protect by Letters Patent is:

1. The method of hydrogenating an ester of abietic acid which includes passing the ester and hydrogen under superatmospheric pressure and at a temperature promoting combination of hydrogen at unsaturated bonds in the abietyl radical relative to a stationary active hydrogenation catalyst.

2. The method of hydrogenating an ester of abietic acid which includes passing the ester and hydrogen under superatmospheric pressure and at a temperature promoting combination of hydrogen at unsaturated bonds in the abietyl radical relative to a stationary active metallic hydrogenation catalyst which has been oxidized and then reduced with hydrogen.

3. The method of hydrogenating an alkyl ester of abietic acid which includes passing the ester and hydrogen under superatmospheric pressure and at a temperature promoting combination of hydrogen at unsaturated bonds in the abietyl radical relative to a stationary active hydrogenation catalyst.

4. The method of hydrogenating an alkyl ester of abietic acid which includes passing the ester and hydrogen under superatmospheric pressure and at a temperature promoting combination of hydrogen at unsaturated bonds in the abietyl radical relative to a stationary active metallic hydrogenation catalyst which has been oxidized and then reduced with hydrogen.

5. The method of hydrogenating the ethyl ester of abietic acid which includes passing the ester and hydrogen under superatmospheric pressure and at a temperature promoting combination of hydrogen at unsaturated bonds in the abietyl radical relative to a stationary active hydrogenation catalyst.

6. The method of hydrogenating the ethyl ester of abietic acid which includes passing the ester and hydrogen under superatmospheric pressure and at a temperature promoting combination of hydrogen at unsaturated bonds in the abietyl radical relative to a stationary active metallic hydrogenation catalyst which has been oxidized and then reduced with hydrogen.

7. The method of hydrogenating the methyl ester of abietic acid which includes passing the ester and hydrogen under superatmospheric pressure and at a temperature promoting combination of hydrogen unsaturated bonds in the abietyl radical relative to a stationary active hydrogenation catalyst.

8. The method of hydrogenating the methyl ester of abietic acid which includes passing the ester and hydrogen under superatmospheric pressure and at a temperature promoting combination of hydrogen unsaturated bonds in the abietyl radical relative to a stationary active metallic hydrogenation catalyst which has been oxidized and then reduced with hydrogen.

9. The method of hydrogenating the glycerol ester of abietic acid which includes passing the ester and hydrogen under superatmospheric pressure and at a temperature promoting combination of hydrogen at unsaturated bonds in the abietyl radical relative to a stationary active hydrogenation catalyst.

10. The method of hydrogenating the glycerol ester of abietic acid which includes passing the ester and hydrogen under superatmospheric pressure and at a temperature promoting combination of hydrogen unsaturated bonds in the abietyl radical relative to a stationary active metallic hydrogenation catalyst which has been oxidized and then reduced with hydrogen.

11. The method of hydrogenating an ester of abietic acid which includes passing the ester and hydrogen under superatmospheric pressure and at a temperature promoting combination of hydrogen at unsaturated bonds in the abietyl radical relative to an active metallic hydrogenation catalyst containing nickel in major proportion.

12. The method of effecting hydrogenation of an ester of abietic acid which includes passing the ester at a temperature promoting combination of hydrogen at unsaturated bonds in the abietyl radical with hydrogen under superatmospheric pressure relative to an active metallic hydrogenation catalyst which has been oxidized and then reduced with hydrogen.

13. The method of effecting hydrogenation of an alkyl ester of abietic acid which includes treating the ester at a temperature promoting combination of hydrogen at unsaturated bonds in the abietyl radical with hydrogen under superatmospheric pressure in the presence of an active metallic hydrogenation catalyst which has been oxidized and then reduced with hydrogen.

14. The method of effecting hydrogenation of an ester of abietic acid which includes passing the ester at a temperature of 150° C.–210° C.

with hydrogen under superatmospheric pressure relative to an active metallic hydrogenation catalyst which has been oxidized and then reduced with hydrogen.

15. The method of hydrogenating a monohydric alcohol ester of abietic acid which includes passing the ester and hydrogen under superatmospheric pressure and at a temperature promoting combination of hydrogen at unsaturated bonds in the abietyl radical relative to a stationary active hydrogenation catalyst.

16. The method of hydrogenating a monohydric alcohol ester of abietic acid which includes passing the ester and hydrogen under superatmospheric pressure and at a temperature promoting combination of hydrogen at unsaturated bonds in the abietyl radical relative to a stationary active metallic hydrogenation catalyst which has been oxidized and then reduced with hydrogen.

17. The method of hydrogenating a polyhydric alcohol ester of abietic acid which includes passing the ester and hydrogen under superatmospheric pressure and at a temperature promoting combination of hydrogen at unsaturated bonds in the abietyl radical relative to a stationary active hydrogenation catalyst.

18. The method of hydrogenating a polyhydric alcohol ester of abietic acid which includes passing the ester and hydrogen under superatmospheric pressure and at a temperature promoting combination of hydrogen at unsaturated bonds in the abietyl radical relative to a stationary active metallic hydrogenation catalyst which has been oxidized and then reduced with hydrogen.

19. The method of hydrogenating an ester of abietic acid which includes passing the ester and hydrogen under superatmospheric pressure and at a temperature promoting combination of hydrogen at unsaturated bonds in the abietyl radical relative to a stationary active base metal hydrogenation catalyst.

DURAIN C. BUTTS.